United States Patent Office 3,794,648
Patented Feb. 26, 1974

3,794,648
PROCESS FOR MAKING CATALYTIC NOBLE
METAL COMPLEXES
Philip D. Hammond and Frederick E. Manemeit, North Haven, and William E. Litz, Jr., Branford, Conn., assignors to Olin Corporation, New Haven, Conn.
No Drawing. Filed June 14, 1971, Ser. No. 153,018
Int. Cl. C07d 35/18
U.S. Cl. 260—270 R         7 Claims

ABSTRACT OF THE DISCLOSURE

An improvement is disclosed in the reaction of a heteroaromatic nitrogen compound with an alkali metal-halogenous noble metal derivative to form a complex. The improvement resides in controlling the pH of the reaction mixture within the range of about 2.0–5.0 in order to minimize noble metal losses and maximize complex yield. The product complex is of utility in catalyzing the reaction of carbon monoxide with aromatic nitro compounds to form aromatic isocyanates.

This invention relates to the preparation of catalytic complexes of noble metal halides and heteroaromatic nitrogen compounds. More particularly, the invention relates to an improvement in a process for preparing such complexes.

Complexes of noble metal halides and heteroaromatic nitrogen compounds are known in the art to be highly effective catalysts in the reaction of carbon monoxide with aromatic nitro compounds to form aromatic isocyanates. See for example U.S. Pat. 3,576,835, which issued Apr. 27, 1971 to Smith et al. One of the prior art processes of preparing these noble metal complexes calls for reacting a heteroaromatic nitrogen compound with an alkali metal-halogenous noble metal derivative, the complex being formed as a precipitate. However, the commercial feasibility of this process has been questionable in view of the fact that not all of the noble metal is converted into the complex. Rather, portions of the noble metal remain in solution, thereby reducing the complex yield of the reaction. These portions may be wasted unless burdensome steps are taken to recover them.

Now it has been found, in accordance with this invention, that the proportion of unused noble metal in the above-described reaction can be minimized, and the complex yield maximized, by controlling the pH of the reaction mixture within the range of about 2.0 to about 5.0.

More in detail, the process to which the present invention is an improvement involves reacting a heteroaromatic nitrogen compound with an alkali metal-halogenous noble metal derivative to form a noble metal complex.

The heteroaromatic nitrogen compounds utilized in preparing the noble metal complex are those containing five or six members in the ring, containing only nitrogen and carbon in the ring, containing no more than two nitrogen atoms in the ring, and containing at least two double bonds in the ring. Suitable compounds of this type are disclosed in The Ring Index, by Patterson and Capell, 2nd ed., American Chemical Society, 1960, and supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic nitrogen-containing ring of the following type.

(I) Substituents on the ring
    (a) halides such as chlorine, bromine, iodine and fluorine
    (b) alkyl containing between 1 and 40 carbon atoms
    (c) aryl such as phenyl, cresyl and xylyl
    (d) olefinic such as allyl, vinyl
    (e) hydroxy
    (f) mercapto
    (g) amino
    (h) alkylamino
    (i) cyano
    (j) oximino
    (k) aldehyde
    (l) ethers such as aryl, alkyl, and alkenyl ethers
    (m) thioethers such as aryl, alkyl, and alkenyl ethers
    (n) carboxy
    (o) carbalkoxy
    (p) carbamyl
    (q) carboaryloxy
    (r) thiocarbamyl
(II) Polycyclic analogues
    (a) fused benzene
    (b) fused cycloaliphatic
    (c) fused nitrogen-containing heteroaromatic
(III) Simple salts
(IV) Quaternary salts
(V) Oxides
(VI) Complexes with inorganic substances other than noble metal halides
(VII) Mixtures of two or more additions of types I–VI.

Listed below are typical heteroaromatic nitrogen compounds and derivatives thereof which are suitable for use in preparing the noble metal complexes.

(1) Five membered ring containing one nitrogen
    (a) 1-methyl pyrrole
    (b) 1-phenyl pyrrole
(2) Five membered ring containing two nitrogens
    (a) imidazole
    (b) 1-methyl imidazole
    (c) pyrazole
(3) Fused benzene and fused nitrogen-containing heteroaromatic derivatives of five membered rings containing one nitrogen
    (a) indole
    (b) indolenine (3-pseudoindole)
    (c) 2-isobenzazole
    (d) indolizine
    (e) 4aH-carbazole
    (f) carbazole
(4) Six membered ring containing one nitrogen and derivatives thereof
    (a) pyridine
    (b) 2,6-dimethylpyridine
    (c) 2,4,6-trimethylpyridine
    (d) 4-phenylpyridine
    (e) 2-vinylpyridine
    (f) 2-styrylpyridine
    (g) 2-bromopyridine
    (h) 2-chloropyridine
    (i) 3-chloropyridine
    (j) 2,6-dichloropyridine (k) 2-bromo-4-methylpyridine
(l) 2-fluoropyridine
(m) 2-allyloxypyridine
(n) 4-phenylthiopyridine
(o) 2-methoxypyridine
(p) picolinic acid
(q) nicotinic acid
(r) 2,6-dicyanopyridine
(s) pyridine-2-aldehyde (picolinaldehyde)
(t) 2-aminopyridine
(u) 4-dimethylaminopyridine
(v) diphenyl-4-pyridylmethane
(w) 4-hydroxypyridine
(x) 2-mercaptopyridine
(y) 2-oximinopyridine (picolinaldoxime)
(z) 4-tertiarybutylpyridine (5) Fused benzene and fused nitrogen-containing heteroaromatic derivatives of six membered ring containing one nitrogen
  (a) quinoline
  (b) 2-chloroquinoline
  (c) 8-hydroxyquinoline
  (d) isoquinoline
  (e) acridine
  (f) phenanthridine
  (g) 7,8-benzoquinoline
  (h) 4H-quinolizine
  (i) naphthyridine
  (j) carboline
  (k) phenanthroline
  (l) benzo [h] isoquinoline
  (m) benzo [g] quinoline
  (n) benzo [g] isoquinoline
  (o) benzo [h] quinoline
  (p) benzo [f] quinoline
  (q) benzo [f] isoquinoline
  (r) 1H-benzo [de] quinoline
  (s) 4H-benzo [de] quinoline
  (t) 4H-benzo [de] isoquinoline
  (u) 1H-benzo [de] isoquinoline
  (v) purine
  (w) adenine
  (x) pteridine
  (y) 7H-pyrazino [2,3-c] carbazole
  (z) pyrazine [2,3-d] pyridazine
  (aa) 4H-pyrido [2,3-c] carbazole
  (bb) pyrido [1',2':1,2] imidazo [4,5-b] quinoxaline
  (cc) 6H-permidine
  (dd) perimidine (6) Six membered ring containing two nitrogens and derivatives thereof
  (a) pyrazine
  (b) 4,6-dimethylpyrimidine
  (c) 2,6-dimethylpyrazine
  (d) pyridazine (7) Fused benzene and fused nitrogen-containing heteroaromatic derivatives of six membered rings containing two nitrogens
  (a) quinoxaline
  (b) 2,3-dimethylquinoxaline
  (c) phthalazine
  (d) quinazoline
  (e) phenazine
  (f) cinnoline (8) Simple salts of heteroaromatic nitrogen compounds or derivatives thereof in sections 1–7 above
  (a) Simple salts include nitrates, hydrohalides, sulfates and acetates of these compounds such as the following:
    (1) pyridine hydrochloride
    (2) 2-chloropyridine-1-oxide hydrochloride
    (3) 4-chloropyridine hydrochloride
    (4) 4,4'-bipyridyl dihydrochloride (9) Quaternary salts of heteroaromatic nitrogen compounds or derivatives thereof of sections 2 and 4–7 above
  (a) Alkyl halides, where alkyl contains 1–40 carbon atoms, acyl halides, and nitroaryl halides, such as:
    (1) 1-methylquinolinium chloride
    (2) laurylpyridinium chloride
    (3) 1-(4-pyridyl) pyridinium chloride hydrochloride

(10) Oxides of heteroaromatic bases and derivatives thereof of sections 2 and 4–7 above
  (a) Oxides include oxides of quinoline, pyridine, isoquinoline and imidazole, and are illustrated by the following oxides:
    (1) pyridine-1-oxide
    (2) 4-bromopyridine-1-oxide
    (3) 2-hydroxypyridine-1-oxide
    (4) picolinic acid-1-oxide
    (5) 4-methoxy pyridine-1-oxide
    (6) 2-bromo-6-methylpyridine-1-oxide
    (7) 2-picoline-1-oxide
    (8) 4-picoline-1-oxide

(11) Complexes of heteroaromatic nitrogen compounds with inorganic substances (other than noble metal halides of sections 2 and 4–7 above)
  (a) Complexes include pyridine, quinoline and isoquinoline complexes illustrated by the following pyridine complexes:
    (1) (pyridine)$_3$·FeCl$_3$
    (2) pyridine·SO$_3$
    (3) pyridine·CrO$_3$
    (4) pyridine·VCl$_3$
    (5) pyridine·V$_2$O$_5$
    (6) pyridine·MoO$_3$ All of the foregoing heteroaromatic nitrogen compounds and derivatives thereof may be utilized in preparing the noble metal complexes. However, it is preferred to employ pyridine, isoquinoline, or quinoline.

Any alkali metal-halogenous noble metal derivative which is capable of forming a complex with a heteroaromatic nitrogen compound may be employed. Such derivatives include those having the formula $$M_2NX_4 \qquad (I)$$

wherein M is an alkali metal, e.g., sodium, potassium or lithium,

N is a noble metal, e.g., ruthenium, rhodium, palladium, osmium, iridium, platinum, silver, or gold, and X is a halogen, e.g., chlorine, bromine, fluorine, iodine, or a mixture thereof.

These alkali metal-halogenous noble metal derivatives can be prepared by reacting, at room temperature and in an aqueous medium, a noble metal halide with an alkali metal halide.

Any noble metal halide may be employed to prepare the alkali metal-halogenous noble metal derivatives. Typical halides which are suitable for the purpose include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride iridium tetrachloride, iridium triiodide, iridium tetraiodide, and mixtures thereof.

It is preferred, however, to employ the halides of noble metals of the platinum series including palladium, rhodium, platinum, iridium, and mixtures thereof. It is also preferred to employ those halides in which the halogen is chlorine, bromine, or a mixture thereof.

Any alkali metal halide may be employed in preparing the alkali metal-halogenous noble metal derivatives. These halides include the chlorides, bromides, iodides and fluorides of sodium, potassium and lithium, and mixtures thereof. It is preferred, however, to employ those alkali metal halides in which the alkali metal is sodium or potassium. It is also preferred to employ those halides in which the halogen is chlorine or bromine.

In preparing the alkali metal-halogenous noble metal derivative, at least one mole, and preferably from about 2 to about 5 moles, of the alkali metal halide are empolyed per each mole of the noble metal halide. However, higher or lower molar proportions may be employed if desired. Conveniently the reaction is carried out in an aqueous medium and at room temperature. At the end of the reaction, the product is filtered to remove precipitated residues and then the aqueous filtrate can be reacted directly with the heteroaromatic nitrogen compound to form the noble metal complex.

In carrying out the noble metal complex-forming reaction, at least one mole, and preferably from about 2 to about 4 moles, of the heteroaromatic nitrogen compound are employed per each mole of the alkali metal-halogenous noble metal derivative. However, higher or lower molar proportions may be employed. The reaction may be carried out at room temperature, but higher temperatures may be employed to speed up the reaction. The main product of the reaction is the noble metal complex which is precipitated and recovered by filtration. A typical such reaction is that between sodium chloropalladite and pyridine which is represented by the following equation $$Na_2PdCl_4 + 2\,pyridine \rightarrow Pd(pyridine)_2Cl_2$$

The above equation is provided by way of illustration only. It will be recognized by those skilled in the art that similar reactions to the one represented by the equation can be carried out to prepare other noble metal complexes according to the invention.

Illustrative other noble metal complexes which are formed according to the method described above include $Rh(pyridine)_3Cl_3$
$Pd(pyridine)_2Cl_4$
$Rh(isoquinoline)_3Cl_3$
$Pd(isoquinoline)_2Cl_2$
$Ir(pyridine)_3Cl_3$
$Ir(isoquinoline)_3Cl_3$
$Pd(isoquinoline)_2Cl_4$
$Pd(pyridine)_2Br_2$
$Pd(pyridine)_2Br_4$
$Pd(isoquinoline)_2Br_2$.

In accordance with the process of this invention, the yield of the noble metal complex is improved by controlling the pH of the reaction mixture within the range of about 2.0–5.0, and preferably from about 2.5 to 4.5. Optimum conversion of noble metal to the complex, furthermore, has been found to obtain at a pH of about 3.0 to about 4.0.

Any means may be employed to control and adjust or maintain the pH of the reaction mixture within the above-specified range. Conveniently, for example, a pH meter is dipped into the reaction mixture which is kept in agitation by any means such as a mechanical agitator or a magnetic stirrer. This enables continuous monitoring of the pH of the reaction mixture. Any suitable acid, such as dilute hydrochloric acid, and any suitable base, such as dilute sodium hydroxide, may then be added dropwise to lower or raise the pH if it should dip below, or rise above, the range indicated above. In some operations, it may be suitable to link the pH meter to a source of base and a source of acid in order to enable automatic, continuous control of the reaction mixture pH.

At the end of the reaction, the precipitated noble metal complex is removed by filtration as a moist material. After drying, it may be directly used to catalyze the reaction of carbon monoxide with aromatic nitro compounds to produce aromatic isocyanates.

By virtue of the improved process of the invention, the proportion of noble metal which is not converted to the complex is minimized and the yield of complex is thereby increased. Thus the need to recover unused nozle metal is reduced or eliminated and noble metal waste is minimized.

The following examples are provided to illustrate the invention. In these examples, the parts and percentages given are by weight unless otherwise specified.

EXAMPLE 1

To 150 grams of an aqueous 3.2% solution of sodium chloride, there were added 5 grams of palladium chloride and 10 grams of concentrated hydrochloric acid. The amount of 10 grams of pyridine was then added after heating the stirred reaction mixture to 80° C. The pH of the mixture was continuously monitored, using a conventional pH meter, and additions of dilute sodium hydroxide or dilute hydrochloric acid were employed to maintain the pH at 3.5–3.8. When the reaction was complete, the reaction mixture was cooled to 25° C. Crystals of formed bis pyridine palladium chloride complex were filtered off and washed repeatedly with water, the wash water being added to the filtrate. The palladium content of the combined filtrate was then analyzed by atomic adsorption and found to be 0.0004%. Based on this, the total weight of the combined filtrate, and the total amount of palladium chloride which was employed, the percentage of lost or unconverted palladium was calculated at 0.032%.

COMPARATIVE TEST 1

The identical procedure of Example 1 was repeated except that the pH of the reaction mixture was maintained at 6 instead of 3.5–3.8. The combined filtrate analyzed 0.029% palladium which was equivalent to a calculated percentage of unconverted palladium of 1.93%. Thus by carrying out the reaction at a pH above the range specified according to the invention, a considerable greater amount of palladium was not converted to the complex.

COMPARATIVE TEST 2

The identical procedure of Example 1 was followed except that the pH of the reaction mixture was maintained at 1.5 instead of 3.5–3.8. The combined filtrate analyzed 0.016 palladium which was equivalent to a calculated percentage of unconverted palladium of about 1.06%. Thus again by carrying out the reaction at a pH below the range specified according to the invention, a considerably greater amount of palladium was not converted to the complex.

What is claimed is:

1. In the process of preparing a complex of a noble metal halide and a heteroaromatic nitrogen compound which process comprises reacting a heteroaromatic nitrogen compound selected from the group consisting of pyridine, isoquinoline and quinoline with an alkali metal-halogenous noble metal having the formula:

$$M_2NX_4$$

where
   M is an alkali metal;
   N is a noble metal selected from the group consisting of ruthenium, rhodium, palladium, osmium, iridium and platinum; and
   X is a halogen;
in an aqueous medium, the improvement which comprises controlling the pH of the reaction mixture from about 2.0 to about 5.0, thereby increasing the conversion of said noble metal into said complex.

2. The process of claim 1 wherein said pH ranges from about 2.5 to about 4.5.

3. The process of claim 1 wherein said pH ranges from about 3.0 to about 4.0.

4. The process of claim 1 wherein said halogen in said alkali metal-halogenous noble metal derivative is selected from the group consisting of chlorine, bromine, and a mixture thereof.

5. The process of claim 1 wherein said noble metal is selected from the group consisting of palladium, rhodium, platinum, iridium, and a mixture thereof.

6. The process of claim 5 wherein said noble metal is palladium, said heteroaromatic nitrogen compound is pyridine, said halogen is chlorine and said pH ranges from about 3.0 to about 4.0.

7. The process of claim 1 wherein said alkali metal-halogenous noble metal derivative is the product of reacting sodium chloride with palladium chloride in an aqueous medium and wherein said pH is from about 3.5 to about 3.8.

References Cited

UNITED STATES PATENTS

| | | | |
|---|---|---|---|
| 3,450,730 | 6/1969 | Scheben | 260—270 R |
| 3,576,835 | 4/1971 | Smith | 260—270 R |
| 3,585,231 | 6/1971 | Hurley | 260—270 R |
| 3,654,279 | 4/1972 | Hurley et al. | 260—270 |

DONALD G. DAUS, Primary Examiner

U.S. Cl. X.R.

260—240.9, 242, 286 Q, 299, 313.1, 315, 453 P